United States Patent
Bernstorf et al.

(10) Patent No.: US 6,595,256 B1
(45) Date of Patent: Jul. 22, 2003

(54) PNEUMATIC TIRE HAVING A BODY CORD INSERT THAT REDUCES THE ROLLING RESISTANCE OF THE TIRE

(75) Inventors: Carolyn W. Bernstorf, Wadsworth, OH (US); Jean-Yea Chen, Hudson, OH (US); Jie Jin, Stow, OH (US); Masahiro Takayama, Hamura (JP); Hidetoshi Yokota, Kanagawa (JP)

(73) Assignee: Bridgestone/Firestone North American Tire, LLC, Nashville, TN (US)

( * ) Notice: Subject to any disclaimer, the term of this patent is extended or adjusted under 35 U.S.C. 154(b) by 16 days.

(21) Appl. No.: 09/668,509

(22) Filed: Sep. 22, 2000

(51) Int. Cl.⁷ .................. B60C 15/00; B60C 15/06; B60C 9/02
(52) U.S. Cl. ................. 152/542; 152/539; 152/546; 152/552; 152/554
(58) Field of Search .................. 152/539, 541, 152/546, 542, 554, 555, 552

(56) References Cited

U.S. PATENT DOCUMENTS

| | | | |
|---|---|---|---|
| 3,160,192 A | 12/1964 | Drew | 152/355 |
| 3,406,733 A | 10/1968 | Boileau | 152/362 |
| 3,455,100 A | 7/1969 | Sidles et al. | 57/152 |
| 3,540,512 A | 11/1970 | Helmovics, Jr. et al. | 152/359 |
| 3,638,705 A * | 2/1972 | Devienne | 152/542 |
| 3,736,973 A | 6/1973 | Mezzanotte et al. | 152/354 |
| 3,774,663 A | 11/1973 | Montagne | 152/362 R |
| 3,842,883 A * | 10/1974 | Masson et al. | 152/209.5 |
| 4,024,901 A | 5/1977 | Poque | 152/354 |
| 4,129,162 A | 12/1978 | DeWitt | 152/354 RB |
| 4,266,995 A * | 5/1981 | Kitazawa et al. | 156/123 |
| 4,848,431 A | 7/1989 | Kobayashi et al. | 152/548 |
| 4,934,431 A | 6/1990 | Agari et al. | 152/543 |
| 4,962,803 A | 10/1990 | Welter | 152/541 |
| 5,160,384 A | 11/1992 | Ueyoko et al. | 152/454 |
| 5,309,971 A | 5/1994 | Baker et al. | 152/541 |
| 5,435,370 A * | 7/1995 | Ahmad et al. | 152/550 |
| 5,616,198 A | 4/1997 | Suzuki et al. | 152/556 |
| 5,669,994 A | 9/1997 | Tsuruta | 152/541 |
| 5,730,815 A | 3/1998 | Sakamoto et al. | 152/554 |
| 5,772,811 A | 6/1998 | Ueyoko et al. | 152/540 |
| 5,871,600 A | 2/1999 | Oare et al. | |
| 5,871,602 A | 2/1999 | Paonessa et al. | |
| 5,871,606 A | 2/1999 | Sakamoto et al. | 156/133 |
| 6,026,878 A | 2/2000 | Zhang et al. | |

FOREIGN PATENT DOCUMENTS

| | | |
|---|---|---|
| DD | 147 080 | 3/1981 |
| JP | 55091410 | * 7/1980 |
| JP | 58004610 | * 1/1983 |
| JP | 04066308 | * 3/1992 |
| JP | 07144506 | 11/1993 |
| JP | 06328917 | * 11/1994 |
| JP | 07156620 | * 6/1995 |
| WO | WO 98/54008 | 12/1998 |

* cited by examiner

*Primary Examiner*—Michael W. Ball
*Assistant Examiner*—Justin Fischer
(74) *Attorney, Agent, or Firm*—Michael R. Huber; Fred H. Zollinger, III

(57) ABSTRACT

A pneumatic tire includes a body having a plurality of main body cords. The tire includes an upper section above the maximum section width and a lower section below the maximum section width. The modulus of the body cords is configured to be larger in the lower section than in the upper section. This modulus ratio decreases the rolling resistance of the tire. The increased modulus in the lower section is achieved by providing a body cord insert wrapped around the bead core and bead filler. The ends of the body cord insert are disposed against each other so that the entire bead filler is surrounded. The body cord insert extends substantially over the entire lower section of the tire.

20 Claims, 2 Drawing Sheets

PNEUMATIC TIRE HAVING A BODY CORD INSERT THAT REDUCES THE ROLLING RESISTANCE OF THE TIRE

BACKGROUND OF THE INVENTION

1. Technical Field

The present invention generally relates to pneumatic tires and, more particularly, to a pneumatic tire having a body cord insert that improves the rolling resistance of the tire. Specifically, the present invention is directed to a pneumatic tire having a body cord divided into upper and lower sections wherein the ratio of the modulus of the upper section to the modulus of the lower section is reduced in order to decrease the rolling resistance of the tire. The ratio is reduced by providing a body cord insert around the bead assembly that increases the modulus of the lower section of the body cord.

2. Background Information

In an inflated and loaded condition, a radial tire is subject to bending moments at the shoulder areas in both the leading and trailing positions of the tire footprint. The strains and stresses created by the moments are directly related to the rolling resistance of the tire. The art recognizes that tire carcass design influences the rolling resistance of the tire and desires a tire carcass design that reduces the rolling resistance of the tire.

Previous research and studies have found that the body cord tension ratio (BCTR) strongly influences the rolling resistance of the tire. The BCTR includes the BCTR in the bead and shoulder portions of the tire. In general, the art recognizes that the rolling resistance is lower when the BCTR in the bead area is high. The art thus desires a tire carcass structure that increases the BCTR in the bead portion of the tire.

SUMMARY OF THE INVENTION

In view of the foregoing, an aspect of the present invention is to reduce the rolling resistance of a pneumatic tire by improving the carcass design. In particular, the invention improves the rolling resistance by optimizing the body cord stiffness. The invention optimizes body cord stiffness by dividing the body cord in a tire section into two sections and optimizing the ratio of stiffnesses of the areas to reduce rolling resistance. The invention provides a tire carcass having a body cord insert disposed around the bead assembly to increase the BCTR in the bead area. The body cord insert is disposed below the maximum section width and includes two end portions that are disposed against each other above the bead filler. In one embodiment, the ends of the body cord insert are disposed 0.3 inches to 0.6 inches from each other. The upper end portion of the body cord turn up is disposed zero to 0.5 inches below the maximum section width of the tire.

BRIEF DESCRIPTION OF THE DRAWINGS

The preferred embodiment of the invention, illustrative of the best mode in which applicant contemplated applying the principles of the invention, is set forth in the following description and is shown in the drawings and is particularly and distinctly pointed out and set forth in the appended Claims.

Similar numbers refer to similar elements throughout the specification.

DESCRIPTION OF THE PREFERRED EMBODIMENTS

Figure 1:
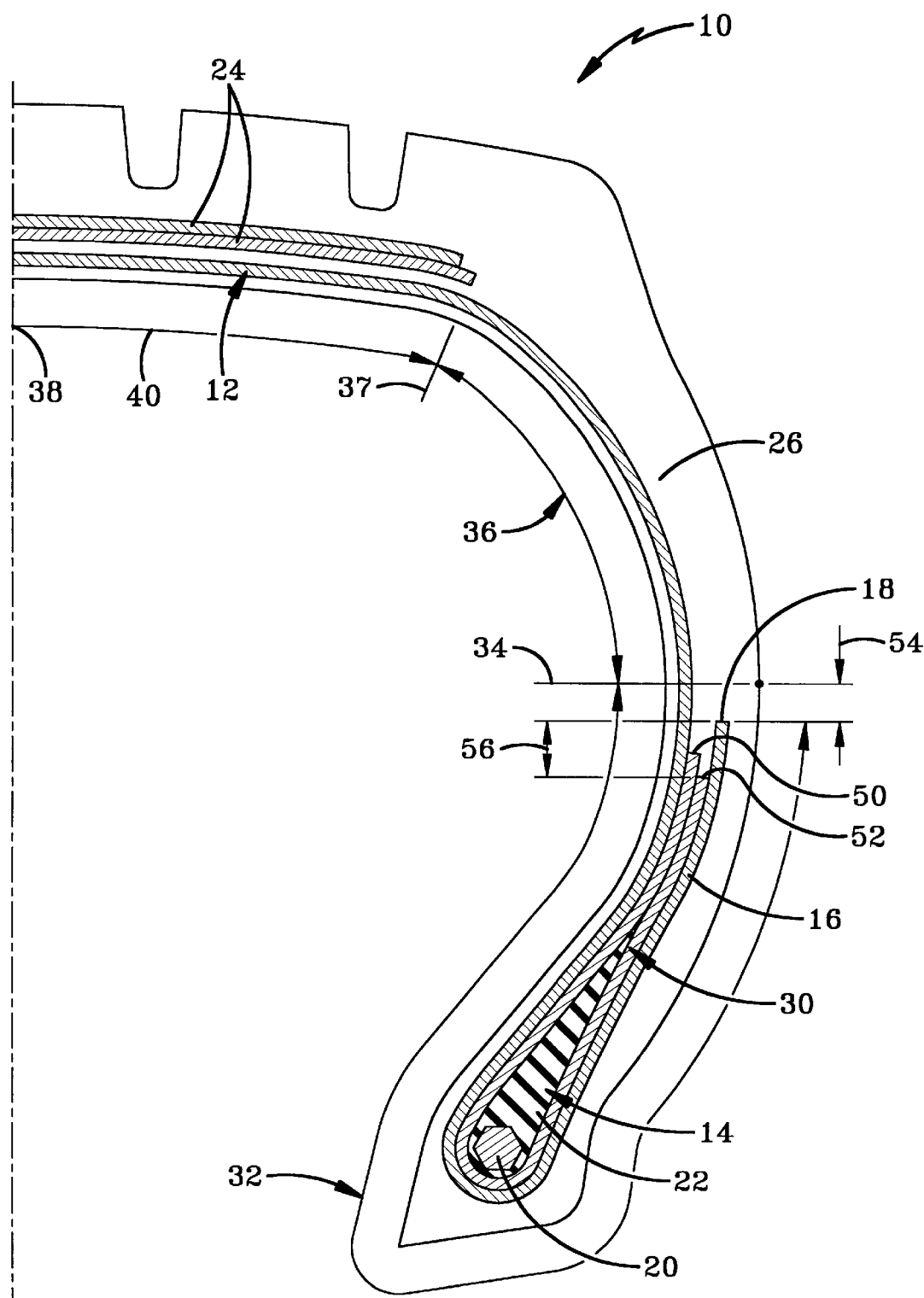
FIG. 1 is a cross sectional view of half of a pneumatic tire having the structure of a first embodiment of the present invention.

The first embodiment of the reduced rolling resistance tire is indicated generally by the numeral 10 in FIG. 1. Tire 10 includes a ply of radial body cords 12 that extend and wrap around a pair of bead assemblies 14. Only half of tire 10 is depicted in the drawings with the other half being a substantial mirror image of the half depicted. The ply of body cords 12 includes a turn up portion 16 disposed axially outside bead assembly 14. Turn up portion 16 includes a radial outer end 18. Each bead assembly 14 includes a bead core 20 and a bead filler 22. The structures of bead core 20 and bead filler 22 are similar to those known in the art. Tire 10 also includes belt plies 24. Bead assemblies 14, belt plies 24, and body cord ply 12 is disposed in the body 26 of tire 10. Tire 10 also includes a body cord insert 30 wrapped around each bead assembly 14. Body cord insert 30 decreases the rolling resistance of tire 10 by increasing the body cord tension in the bead area of tire 10.

The invention applies the body cord tension ratio (BCTR) concept to design a low energy loss radial tire. The following parameters are first determined to design tire 10:

$BCTR_{bead} = BCT_{bead}/BCT_{total}$ $BCTR_{shldr} = BCT_{shldr}/BCT_{total}$.

$BCTR_{bead}$ is the body cord tension ratio in the bead section 32 that extends from the maximum section width 34 to turn up end 18. Bead section 32 thus defines the lower section of tire 10. $BCT_{bead}$ is the summation of body cord tension in bead section 32. When multiple body cord plies 12 are present, multiple body cord tensions in this area are summed. Thus, $BCT_{bead}$ includes the body cord tension of body cord insert 30. $BCT_{total}$ is the summation of body cord tension from the center 38 of the tire section to end 18 of turn up in an inflated condition. Again, when multiple body cords 14 are present, multiple body cord tension in this area are summed.

In order to calculate $BCTR_{bead}$, tire 10 is divided into a tread section 40 (from center 38 to edge 37), shoulder section 36, and bead section 32. $BCT_{shldr}$, $BCT_{bead}$, and $BCT_{total}$ are then calculated. $BCTR_{shldr}$ is the body cord tension ratio in the shoulder area 36. $BCT_{shldr}$ is the summation of body cord tension from the edge 37 of the first belt ply 24 to maximum section width 34. When multiple body cord plies 12 are present, multiple body cord tension in this area are summed.

Body cord insert 30 increases $BCT_{bead}$ and thus increases $BCTR_{bead}$. Body cord insert allows $BCTR_{bead}$ to be increased without increasing $BCTR_{shldr}$. The larger $BCTR_{bead}$ causes the rolling resistance of tire 10 to be decreased.

Body cord insert 30 extends substantially over the entire lower section of tire 10. In the first embodiment of the invention, body cord insert 30 includes an inner end 50 and an outer end 52. Insert 30 is disposed against itself above bead filler 22. In the preferred embodiment of the invention, insert 30 is disposed against itself for a minimum of 0.25 inches.

Figure 2:
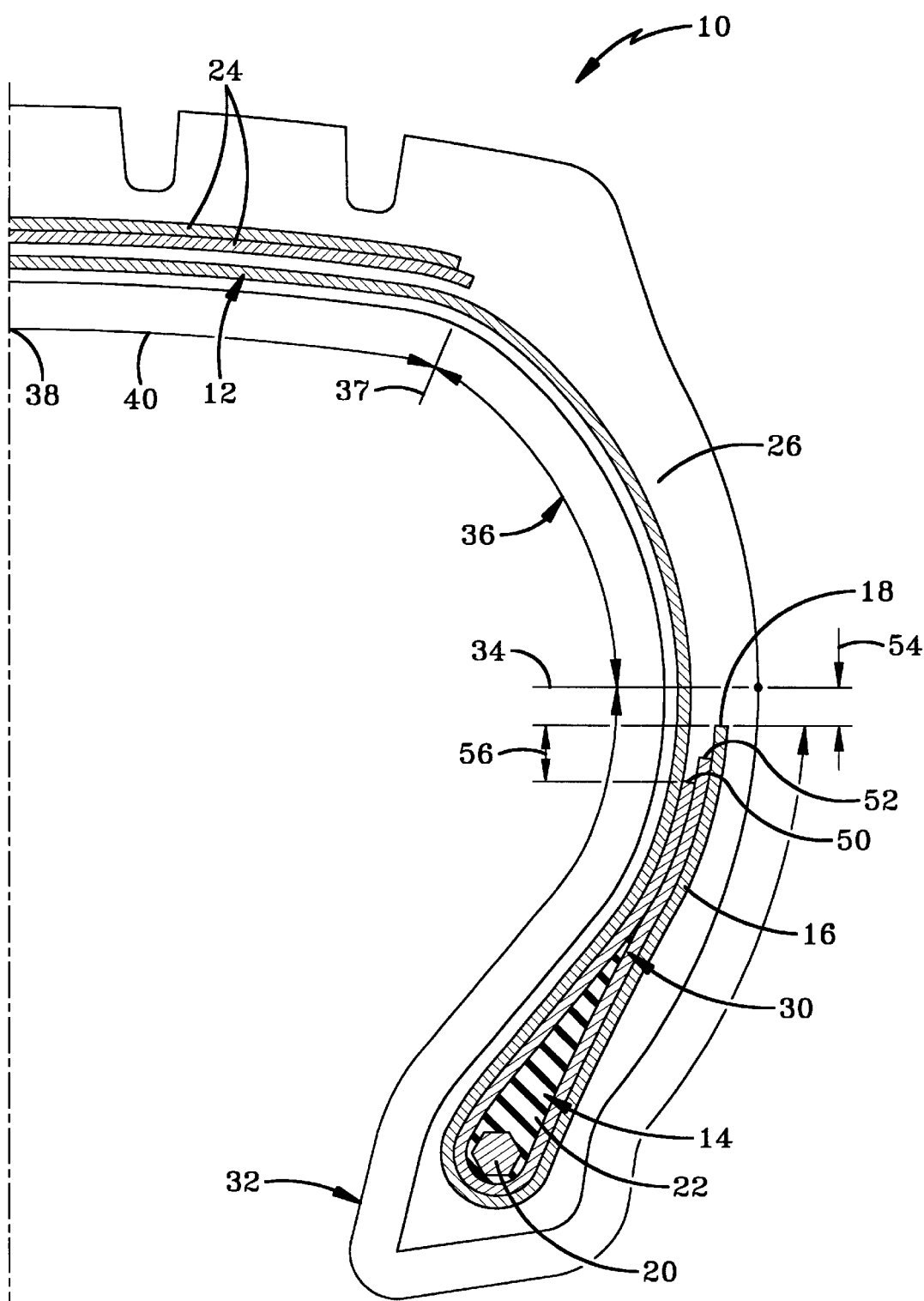
FIG. 2 is a view similar to FIG. 1 showing a second embodiment of the invention.

Turn up end 18 is preferably disposed even with or 0.5 inches below maximum section width 34 as indicated by dimension 54. Body cord insert 30 preferably extends 75 to 100 percent of the height of the turn up of body cord ply 12. In one embodiment, the turn up height is 2.3 inches to 3.9 inches and ends 50 and 52 are disposed 0.3 inches to 0.6 inches below turn up end 18 as indicated by dimension 56. Tire 10 having insert 30 with these dimensions has been found to have improved rolling resistance. In the first embodiment of the invention, end 50 is disposed higher than end 52 with ends 50 and 52 being spaced apart by 0.2 inches. In the second embodiment of the invention, outer end 52 is disposed higher than inner end 50 as depicted in FIG. 2.

Body cord insert 30 has a modulus of 50 to 100 percent of the modulus of body cord ply 12. Body cord insert 30 is disposed at an angle relative to the radial plane of 0 to 45 degrees with the body cords of body cord ply 12 being disposed at an angle of zero.

The insertion of body cord insert 30 preferably increases the BCTR at the lower portion of the sidewall from 5 percent to 15 percent higher than the BCTR at the upper portion of the sidewall. In general, an increase of at least 5 percent is desired to improve the rolling resistance of tire 10.

The invention is not limited to the specific illustrative details that appear above. Other variations and modifications are equivalent for the stated and illustrated functions without departing from the spirit or scope of the invention as defined by the following claims.

What is claimed is:

1. A pneumatic tire having a single body cord ply; the tire comprising:
    a body having a maximum section width, an upper section above the maximum section width, and a lower section below the maximum section width;
    a pair of bead assemblies disposed in the lower section of the body;
    a single ply of body cords disposed in the body;
    the single ply of body cords extending between the bead assemblies;
    the single ply of body cords including a turn up portion having a turn up end;
    a body cord insert wrapped around each of the bead assemblies;
    the body cord insert having an inner end and an outer end; and
    the ends of the body cord insert being disposed against each other radially above the bead assembly;
    the ends of the turn up portion and the body cord insert being disposed between 75 and 100 percent of the height of the maximum section width of the tire to increase the body cord tension ratio in the lower section of the tire.

2. The tire of claim 1, wherein the inner and outer ends of the body cord insert are disposed 75 to 95 percent of the height of the end of the body cord turn up; the height being measured from the rim heel line.

3. The tire of claim 2, wherein the end of the body cord turn up is disposed 0 to 0.5 inches below the maximum section width.

4. The tire of claim 3, wherein the inner and outer ends of the body cord insert are disposed 0.3 inches to 0.6 inches below the end of the body cord turn up.

5. The tire of claim 4, wherein the modulus of the body cord insert is 50 to 100 percent of the modulus of the body cord ply.

6. The tire of claim 5, further comprising a pair of belt plies disposed in the body.

7. The tire of claim 4, wherein the body cord insert is disposed at an angle of zero to 45 degrees with respect to the radial direction.

8. The tire of claim 7, wherein the body cord ply is disposed in the radial direction.

9. The tire of claim 4, wherein each of the bead assemblies includes a bead filler; each body cord insert wrapping completely around one bead filler and being disposed against itself above the bead filler.

10. The tire of claim 9, wherein the inner end of the body cord insert is disposed higher than the outer end of the body cord insert.

11. The tire of claim 9, wherein the outer end of the body cord insert is disposed higher than the inner end of the body cord insert.

12. A pneumatic tire having a single body cord ply; the pneumatic tire comprising:
    a body having a maximum section width, an upper section above the maximum section width, and a lower section below the maximum section width;
    a pair of bead assemblies disposed in the lower section of the body;
    each of the bead assemblies including a bead core and a bead filler;
    a single ply of body cords disposed in the body; the body having only a single ply of body cords;
    the single ply of body cords extending in a radial direction between the bead assemblies;
    the single ply of body cords including a turn up portion having a turn up end;
    a single body cord insert wrapped around each of the bead assemblies;
    the single body cord insert having an inner end and an outer end;
    the inner and outer ends of the single body cord insert being disposed against each other above the bead fillers
    the turn up end of the single body cord ply being disposed zero to 0.5 inches below the maximum section width; and
    the ends of the single body cord insert being disposed 0.3 inches to 0.6 inches below the turn up end of the single body cord ply;
    the ends of the turn up portion and the body cord insert being disposed between 75 and 100 percent of the height of the maximum section width of the tire to increase the body cord tension ratio in the lower section of the tire.

13. The tire of claim 12, wherein the modulus of the body cord insert is 50 to 100 percent of the modulus of the body cord ply.

14. The tire of claim 12, wherein the inner end of the body cord insert is disposed higher than the outer end of the body cord insert.

15. The tire of claim 12, wherein the outer end of the body cord insert is disposed higher than the inner end of the body cord insert.

16. The tire of claim 12, further comprising a pair of belt plies disposed in the body.

17. The tire of claim 12, wherein the body cord insert is disposed at an angle of zero to 45 degrees with respect to the radial direction.

18. The tire of claim 12, wherein the inner and outer ends of the body cord insert are disposed 75 to 95 percent of the height of the end of the body cord turn up.

19. An improved pneumatic tire having a maximum section width, an upper section above the maximum section width, and a lower section below the maximum section width; a pair of bead assemblies disposed in the lower section of the body; each of the bead assemblies including a bead core and a bead filler; a single ply of body cords disposed in the body; the single ply of body cords extending in a radial direction between the bead assemblies; the single ply of body cords including a turn up portion having a turn up end; the turn up portion being disposed substantially throughout the entire lower section of the tire; the improvement comprising:

a single body cord insert wrapped around each of the bead assemblies;

the single body cord insert having an inner end and an outer end;

the inner and outer ends of the single body cord insert being disposed against each other above the bead fillers; the inner and outer ends being disposed against each other for at least 0.25 inches;

the turn up end of the single body cord ply being disposed zero to 0.5 inches below the maximum section width;

the turn up end of the single body cord ply being disposed 100% to 75% of the height of the maximum section width;

the ends of the single body cord insert being disposed 0.3 inches to 0.6 inches below the turn up end of the single body cord ply; and the body cord insert having a plurality of cords disposed parallel to the body cords in the single ply of body cords.

20. The improvement of claim 19, wherein the body cord tension ratio in the lower section of the tire is raised at least five percent with the single body cord insert compared to the body cord tension ratio without the single body cord insert.

* * * * *